United States Patent [19]

Schultz

[11] 4,249,965
[45] Feb. 10, 1981

[54] METHOD OF GENERATING CARRIER GAS

[75] Inventor: Thomas J. Schultz, Toledo, Ohio

[73] Assignee: Midland-Ross Corporation, Cleveland, Ohio

[21] Appl. No.: 943,821

[22] Filed: Sep. 19, 1978

[51] Int. Cl.² .......................................... B23K 35/24
[52] U.S. Cl. .................................. 148/27; 148/16.5; 148/16.6; 252/375
[58] Field of Search .................. 148/16.5, 16.6, 27; 252/373, 374, 375

[56] References Cited

U.S. PATENT DOCUMENTS

| | | | |
|---|---|---|---|
| 2,673,821 | 3/1954 | Stutzman | 148/16.5 |
| 3,201,290 | 8/1965 | Wyss | 148/16.5 |
| 3,519,257 | 7/1970 | Winter et al. | 148/16.5 |
| 3,620,518 | 11/1971 | Winter et al. | 148/16.5 |
| 4,051,231 | 9/1977 | Bond et al. | 252/373 |

OTHER PUBLICATIONS

The Metals Handbook, 8th Edition, vol. 2, Heat Treating Cleaning and Finishing, ASM Handbook Committee, p. 94.

Primary Examiner—L. Dewayne Rutledge
Assistant Examiner—John P. Sheehan
Attorney, Agent, or Firm—Richard A. Negin

[57] ABSTRACT

The present invention is a method of generating Class 302 type carrier gas for use in carburizing processes. The gas has a composition of approximately 40% nitrogen, 40% hydrogen and 20% carbon monoxide. The nitrogen is mixed with the methanol in a vaporizer where the methanol is vaporized. The vaporized methanol and nitrogen mixture is heated in a catalyst filled retort where methanol reacts to yield hydrogen and carbon monoxide. The relative volume percents of the nitrogen, hydrogen, and carbon monoxide is substantially the same as in the Class 302 type carrier gas.

9 Claims, 1 Drawing Figure

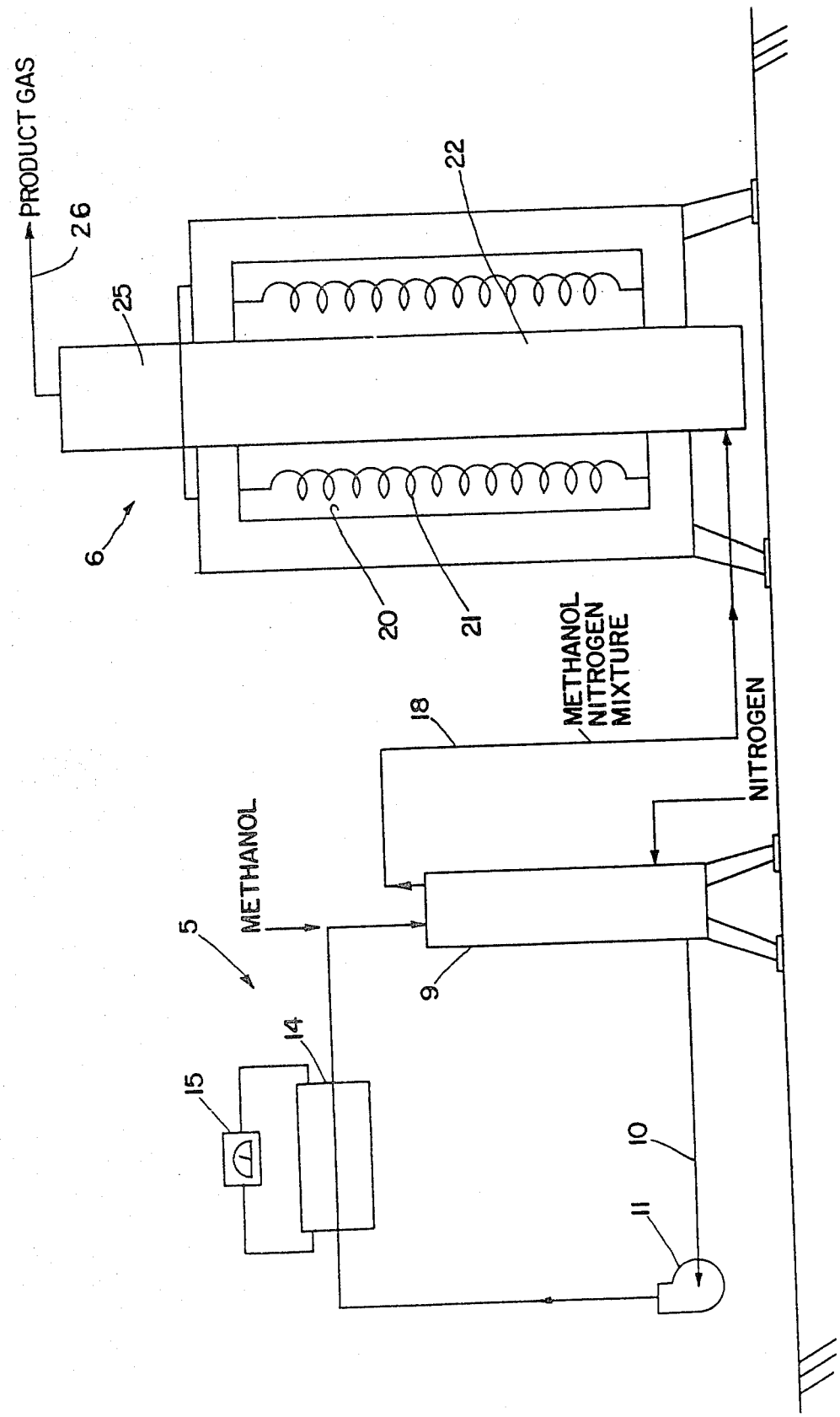

METHOD OF GENERATING CARRIER GAS

BACKGROUND OF THE INVENTION

This invention is in the field of gas atmospheres employed in furnaces; more particularly, the invention relates to the generation of a carrier gas for use in carburizing furnaces.

The Metals Handbook, Eighth Edition, Volume 2, Heat Treating, Cleaning and Finishing, prepared under the direction of the ASM Handbook Committee and published by the American Societies for Metals, Metals Park, Ohio, at page 94, column 2, reports on carrier gases used in gas carburizing furnaces. In particular, carrier gas Class 302 is produced by the endothermic reaction of natural gas and air and has a composition by percent volume of 39.8% nitrogen, 20.7% carbon monoxide, 38.7% hydrogen and 0.8% methane. The text goes onto note:

"Endothermic gas (Class 302) is generally the preferred type of carrier gas for use in gas carburizing furnaces and is the most widely used. It offers a broad range of carbon control, a moderate amount of carbon availability for carburizing, and when operated with dew points of +20° F. and above, continuous operation without weekend shutdowns for burn out."

Class 302 type carrier gas is a preferred and popularly used carrier gas in carburizing processes. Many control schemes for carburizing now require a carrier gas having the composition of Class 302. Carrier gases having this composition are presently generated from natural gas or methane. Should the availability of methane or natural gas be restricted, it will be necessary to find a suitable replacement which can be used without requiring changes in the method of carburizing control. Preferably the replacement should have a composition as close to that of Class 302 type carrier gas as possible.

The present invention is a method of producing Class 302 type carrier gas from methanol and nitrogen. It will be helpful in understanding the method of the present invention to consider the state of the art.

U.S. Pat. No. 3,519,257 describes a process and apparatus in which the novelty resides in the use of an annealing furnace which has a catalytically active surface therein for use in the in situ formation of gases. The walls of the furnace are treated with a catalyst. Suitable gases including natural gas, methane, etc., or liquid hydrocarbons, such as alcohol may be reacted with oxygen in the presence of the catalyst to form a suitable atmosphere within the furnace to carburize the surface of metal.

U.S. Pat. No. 3,620,518 is a continuation-in-part of U.S. Pat. No. 3,519,257 with the additional step of preheating oxygen containing gas, such as air, before feeding it into the furnace.

Both of these patents describe a process for producing both a carrier gas and carburizing gas in situ by catalytically reacting feed gases with air inside the annealing furnace. Neither patent indicates a particular method for producing the popular Class 302 type carrier gas or discloses, describes or suggests a suitable control system for making a Class 302 type carrier gas in situ in the furnace.

U.S. Pat. No. 3,201,290 describes a process for automatically controlled carburizing of the surface layer of steel articles by gas carburizing in a gas atmosphere formed in the furnace chamber by thermal decomposition of separately fed substances on which yields a carrier gas and another which yields a carburizing gas. The combination of feed materials being such that during the cracking and carburizing reactions, the resulting two gases provides substantially the same and substantially constant gas composition. The supply of the gas providing substances, preferably of the substance yielding the carburizing gas, is controlled by continuously determining the content of one constituent of the furnace gases. Methanol is described as suitable liquid which may be cracked in the furnace to form a carrier gas of carbon monoxide and hydrogen. The methanol cracking occurs at a furnace temperature of 800° C. (1472° F.). The reaction products consist mainly of $\frac{1}{3}$ carbon monoxide and $\frac{2}{3}$ of hydrogen. However, if the carburizing liquids are added to this mixture according to the carbon demand of the surfaces, the carbon monoxide content changes very differently for different carburizers with increasing carburizing gas consumption. The carburizing process must be carried out under conditions which are suitable for the methanol to crack in order for this process to succeed. Additionally, the methanol cracking reaction is affected by the carbon demand of the metal surfaces and the parallel formation of carburizing gases within the furnace chamber. The use of methanol as a source of carrier gas in this process is successful only under very particular conditions and is affected by other occurrences within the furnace chamber. Although carbon monoxide and hydrogen are formed for uses as a carrier gas in this process, they do not necessarily result in a carrier gas of the type of Class 302.

Where methanol has been used in carburizing furnaces in the past, it has been injected directly into the furnace chamber. The methanol in the furnace chamber either reacts with other materials or cracks to form suitable carrier and carburizing gases. Nowhere has the reaction of methanol within carburizing furnaces been directed toward the production of the preferred Class 302 type carburizing gas inside or outside the furnace chamber, nor has a control system been disclosed which can control reaction of methanol within the furnace chamber to yield Class 302 type carburizing gas.

SUMMARY OF THE INVENTION

The present invention is a method of generating Class 302 type carrier gas for use in carburizing processes. The gas has a composition of approximately 40% nitrogen, 40% hydrogen and 20% carbon monoxide. The nitrogen is mixed with the methanol in a varporizer where the methanol is vaporized. The vaporized methanol and nitrogen mixture is heated in a catalyst filled retort where the methanol reacts to yield hydrogen and carbon monoxide. The relative volume percents of the nitrogen, hydrogen, and carbon monoxide is substantially the same as the Class 302 type carrier gas.

Thus, it is the general object of the present invention to provide a method of generating Class 302 type carrier gas from a mixture of methanol and nitrogen. It is another object of the present invention to produce Class 302 type carrier gas from a methanol and nitrogen mixture in the same inert gas generator in which Class 302 type carrier gas is now produced from methane or natural gas, but using the appropriate catalyst.

It is a further object of the present invention to provide an alternate source of feed stock for Class 302 type carrier gas which may be used in existing gas generators with minimum modification. Another object of the present invention to provide Class 302 type carrier gas for use in carburizing furnaces should a shortage of natural gas or methane develop.

It is an object of this invention to obtain one or more of the objects set forth above. These and other objects and advantages of this invention will become apparent to those skilled in the art from the following specification and claims, reference being had to the attached drawing.

BRIEF DESCRIPTION OF THE DRAWING

The attached FIGURE shows a flow diagram for the gas generation system of the present invention.

DESCRIPTION OF THE PREFERRED EMBODIMENT

The present invention will be understood by those skilled in the art by reference to the flow diagram of the gas generation system. The gas generation system can be divided into two main sections, the vaporizer section 5 and the generator section 6.

Nitrogen and methanol are fed into the vaporizer 9 and the methanol is recycled through recycle line 10. The methanol can be fed into line 10 as shown or directly into the varporizer. Disposed in recycle line 10 is a recirculating pump 11 and a heating means such as an electric heater 14 having suitable control means 15 to control the electric heater 14. The recycling methanol is heated so that the vaporizer operates at a desired temperature. Preferably, the vaporizer operates at 100° F. to 130° F. and more particularly at about 100° F. A mixture of methanol and nitrogen passes through line 18 to the generator section 6.

Liquid methanol recycled through recycle line 10 is preferably fed into the top of vaporizer 9. The liquid runs down a packed bed within the vaporizer 9. Suitable packing as are known in the art such as ceramic saddles can be used. The nitrogen gas is preferably fed into the vaporizer at or near the bottom so that it flows up countercurrent to the liquid methanol. The recycle loop returns the liquid methanol from the bottom back to the top of the vaporizer.

The vaporizer is operated to have a nitrogen and methanol vapor stream flow to the generator section 6 in a concentration ratio which will ultimately react in the generator to yield Class 302 type carrier gas. The pressure and temperature within the vaporizer 9 and recycle line 10 can be varied to control the concentration ratio of methanol to nitrogen. The pressure is a nominal constant positive pressure, preferably about 1 psig. The methanol evaporates until the partial pressure of the methanol in the gas phase equals the vapor pressure at the control temperature. With the pressure held constant the percent methanol in the gas stream is a function of the temperature. Increasing the control temperature increases the vapor pressure of the methanol and thus the percent methanol in the vaporizer exit stream to the gas generator section 6.

During the preferred operation, the pressure in the vaporizer section is maintained at 1 psig and the temperature of the liquid methanol is controlled to about 100° F. Under these conditions the gas stream leaving vaporizer section 5 through line 18 is about 33% methanol by volume and 67% nitrogen by volume. The vaporizer section 5 can be sized to provide a feed gas flow to generator section 6 which is compatible with the capacity of the generator section 6. Typically, this is from about 1,200 standard cubic feet per hour (scfh) to about 10,000 scfh. However, the vaporizer section 5 can be sized to accommodate gas generators outside this range.

The gas generator section 6 of the present invention has the same construction as an endothermic gas generator used to produce carrier gas from methane or natural gas and particularly to produce Class 302 type carrier gas for carburizing furnaces. The only change necessary to use this generator section 6 for the present invention is to use it with a suitable catalyst. The generator section comprises an insulated chamber 20 in which there is a generator heating means, such as electric heating elements 21 to heat catalyst filled retort 22 within the insulated chamber 20.

Line 18 is connected to the catalyst filled retort 22. Preferably line 18 is connected to the bottom of the retort 22 so that gases pass into the bottom and up through the retort 22. The methanol and nitrogen mixture, heated to about 100° F., passes through line 18 to the retort 22 where it reacts to form Class 302 type carburizing carrier gas having a composition of approximately 40% hydrogen, 40% nitrogen and 20% carbon monoxide. The methanol is catalytically cracked in the presence of heat within retort 22. The retort is heated between 400° F. and 1200° F. and preferably to 600° F. The catalyst used can be selected from a group based on copper, nickel and platinum with copper based catalysts being preferred. The product gas passes from retort 22 to cooler 25 where the product gas is cooled and passed out of the generator section through an exit line 26.

In an alternate embodiment, the methanol can be vaporized in vaporizer 9 in vaporizer section 5 and passed to the retort section 22 in generator section 6. The methanol reacts in the retort in the presence of heat in the catalyst to form carbon monoxide and hydrogen and then passes through cooler 25 and out of the generator section. A desired amount of nitrogen can be added to the product gas. Preferably, nitrogen is added to the product gas so that resultant gas will have the same volume percentages of nitrogen, carbon monoxide and hydrogen as Class 302 type carrier gas. A drawback to this embodiment is that nitrogen is not added to the retort. Nitrogen in the retort acts as an inert diluent to the cracking methanol in the retort 22 and helps to minimize soot formation.

In either the preferred or the alternate method of producing carrier gas and, more particularly, Class 302 type carrier gas for gas carburizing furnaces, nominal amounts of carbon dioxide, water and methane are produced. These amounts are very small and the product gas is essentially equivalent to Class 302 type carrier gas which also is noted to have a nominal amount of methane.

The production of Class 302 type carrier gas from methanol by use of the process of the present invention uses the basic equipment for gas generation that is used to produce Class 302 type carrier gas from natural gas or methane. The only changes in the apparatus for the production of Class 302 type carrier gas in the present invention is the use of a different catalyst in the generator section and the use of a vaporizer. The Class 302 type carrier gas produced in the present invention can be used in carburizing furnaces without changing the carburizing process or control schemes should there be a shortage in the supply of methane or natural gas or if there is any reason to use a liquid material such as methanol as a starting material in the production of Class 302 type carrier gas.

Modifications, changes, and improvements to the preferred form of the invention herein disclosed, described and illustrated may occur to those skilled in the art who come to understand the principals and precepts thereof. Accordingly, the scope of the patent to be issued herein should not be limited to the particular embodiments of the invention set forth herein, but rather should be limited by the advance of which the invention has promoted the art.

What is claimed is:

1. A method of generating a carrier gas for use in a carburizing process, the gas having a composition of approximately 40% nitrogen, 40% hydrogen and 20% carbon monoxide comprising the steps of:
mixing gaseous nitrogen and liquid methanol in a vaporizer;
vaporizing the methanol;
feeding the vaporized methanol and nitrogen mixture into a retort heated to between 400° F. and 1200° F. and containing a metal based catalyst selected from the group consisting of copper, nickel and platinum;
reacting the methanol in the retort to yield hydrogen and carbon monoxide;
passing the hydrogen, carbon monoxide and nitrogen out of the retort.

2. The method as recited in claim 1 wherein the methanol is vaporized at 100° F. to 130° F.

3. The method as recited in claim 2 wherein the retort is heated to approximately 600° F.

4. The method as recited in claim 1 wherein the carrier gas is generated in the same equipment which can be used to generate a Class 302 type carrier gas from natural gas or methane and air, the equipment having a suitable catalyst for the cracking of methanol to hydrogen and carbon monoxide.

5. A method of generating a carrier gas for use in a carburizing process, the gas having a composition of approximately 40% nitrogen, 40% hydrogen and 20% carbon monoxide, in an apparatus having a vaporizer section in which there is a recycle line in which there is disposed a recirculating pump, a heating means having a control means and a vaporizer, and the apparatus having a generator section having a retort, comprising the steps of:
feeding methanol to the vaporizer section;
feeding liquid methanol from the recycle line into the top of the vaporizer;
feeding nitrogen into the bottom of the vaporizer;
vaporizing the methanol passing down through the vaporizer, in the nitrogen flowing up through the vaporizer;
recycling unvaporized liquid methanol in the recycle line from the bottom of the vaporizer through the recirculating pump and the heating means to the top of the vaporizer;
feeding the vaporized methanol and nitrogen mixture into a retort heated to between 400° F. and 1200° F. and containing a metal based catalyst selected from the group consisting of copper, nickel and platinum;
reacting the methanol in the retort to yield hydrogen and carbon monoxide; and
passing the hydrogen, carbon monoxide and nitrogen out of the retort.

6. The method as recited in claim 5 wherein methanol is fed to the vaporizer section at the recycle line.

7. The method as recited in claim 5 wherein methanol is fed to the vaporizer section at the vaporizer.

8. The method as recited in claim 5 further comprising the steps of:
maintaining the pressure in the recycle line at a nominal constant positive pressure; and
heating the liquid methanol to about 100° F. as it is recycled.

9. A method of generating a carrier gas for use in a carburizing process, the gas having a composition of approximately 40% nitrogen, 40% hydrogen and 20% carbon monoxide which comprises:
feeding liquid methanol to a vaporizer;
vaporizing the methanol;
feeding the vaporized methanol into a retort, heated to between 400° F. and 1200° F. and containing a metal based catalyst selected from the group consisting of copper, nickel and platinum;
reacting the methanol in the retort to yield hydrogen and carbon monoxide;
passing the hydrogen and carbon monoxide out of the retort;
mixing nitrogen to the hydrogen and carbon monoxide which has passed out of the retort until the composition is approximately 40% nitrogen.

* * * * *